United States Patent
Ahn et al.

(10) Patent No.: US 6,568,312 B2
(45) Date of Patent: May 27, 2003

(54) THRUST BEARING STRUCTURE FOR SUPPORTING A DRIVING SHAFT OF A VARIABLE DISPLACEMENT SWASH PLATE TYPE COMPRESSOR

(75) Inventors: Hewnam Ahn, Daejeon-si (KR); Taeyoung Park, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 14 days.

(21) Appl. No.: 09/964,799

(22) Filed: Sep. 28, 2001

(65) Prior Publication Data
US 2003/0000378 A1 Jan. 2, 2003

(30) Foreign Application Priority Data
Jun. 30, 2001 (KR) ........................................ 2001-38757

(51) Int. Cl.[7] .................................................. F01B 3/00
(52) U.S. Cl. ........................... 92/71; 384/590; 384/620; 384/606
(58) Field of Search ..................... 92/71; 384/590, 384/604, 606, 620, 622

(56) References Cited

U.S. PATENT DOCUMENTS

| | | | | |
|---|---|---|---|---|
| 3,281,192 A | * | 10/1966 | Daubenfeld | 384/590 |
| 4,907,899 A | * | 3/1990 | Rhoads | 384/620 |
| 5,630,670 A | * | 5/1997 | Griffin et al. | 384/606 |
| 5,953,908 A | * | 9/1999 | Appleby | 60/275 |
| 6,338,613 B1 | * | 1/2002 | Okuno et al. | 92/71 |

* cited by examiner

Primary Examiner—Edward K. Look
Assistant Examiner—Igor Kershteyn
(74) Attorney, Agent, or Firm—Greenblum & Bernstein, P.L.C.

(57) ABSTRACT

Disclosed is a thrust bearing structure for supporting a driving shaft for use in a variable displacement swash plate type compressor. The inventive thrust bearing structure supports a driving shaft of the compressor, and has a specific correlation between the inner and the outer diameters of a stationary race and a driving race, between the races and a cylinder bore and an outer diameter of the driving shaft. That is, a distance between an inner diameter of the stationary race and an outer diameter of the driving shaft is greater than a distance between an outer diameter of the stationary race and a surface of the center bore.

3 Claims, 4 Drawing Sheets

Prior Art

Prior Art

THRUST BEARING STRUCTURE FOR SUPPORTING A DRIVING SHAFT OF A VARIABLE DISPLACEMENT SWASH PLATE TYPE COMPRESSOR

BACKGROUND OF THE INVENTION

1. Field of the Invention

The present invention relates to a variable displacement swash plate type compressor for use in an air conditioner of an automobile, and more particularly, to a thrust bearing structure for supporting a driving shaft thereof in an axial direction wherein a correlation between an inner and an outer diameters of a stationary and a driving races and a center bore and an outer diameter of a driving shaft is specified.

2. Description of the Related Art

In general, a variable displacement swash plate type compressor is used for controlling an amount of a fluid to be ejected by increasing or decreasing a piston stroke depending on an inclination angle of a swash plate.

Referring to FIG. 1, constitution and operation of a general variable displacement swash plate type compressor 1 will be described. The variable displacement swash plate type compressor 1 comprises a cylinder block 2 including a center bore 4 and a plurality of cylinder bores 6 radially formed around the center bore 4, both sides of the cylinder block 2 being hermetically covered with a front housing 8 and a rear housing 10. Between the cylinder block 2 and the front housing 8, an airtight crank chamber 12 is formed, and between the back end of the cylinder block 2 and the rear housing 10, a valve plate 14 is interposed. Further, the rear housing 10 is provided with an inlet and an outlet for a refrigerating gas, a suction chamber 16 and a discharge chamber 18. The refrigerants in the suction and the discharge chambers 16 and 18 flow into/from each of the cylinder bore 6 through a suction and a discharge valve mechanisms. A driving shaft 20 is installed at a central portion of the compressor 1, the driving shaft extending through the front housing 8 into the cylinder block 2. Further, the driving shaft 20 is rotatably supported by radial bearings 22 which are installed at the front housing 8 and the cylinder block 2, and one end thereof is axially supported by a support to prevent the driving shaft 2 from moving the axial direction. The cylinder block 2 is coupled to the front and the rear housings 8 and 10 by a through bolt 24. In the crank chamber 12, a rotor 26 is fixedly mounted around the driving shaft 20 extending across the crank chamber 12 in such a manner that the rotor 26 rotates together with the driving shaft 20. A swash plate 28 is rotatably installed around the driving shaft 20. Further, between the driving shaft 20 and the swash plate 28 a spherical sleeve may be interposed. In this case, the swash plate 28 is rotatably supported by an outer surface of the spherical sleeve. In FIG. 1, the swash plate 28 is positioned at a maximum angle of the inclination. In this case, a stop surface 32a of a protuberance 32 of the swash plate 28 comes into contact with the rotor 26 and a spring 30 is compressed in the maximum state. Therefore, the rotor 26 confines a maximal angle of the inclination of the swash plate. Further, the driving shaft 20 is provided with a stopper 34 for defining the minimum angle of the inclination of the swash plate 28.

Further, the swash plate 28 and the rotor 26 are connected with each other through a hinge mechanism so that they rotate together. To be more specific, a support arm 36 protrudes outwardly from one side of the rotor 26 in the axial direction of the driving shaft 20, and an arm 38 extends from one side of the swash plate 28 to the support arm 36. The arms 36 and 38 are connected to each other through a pin 40.

A piston 42 is slidably disposed in each of the cylinder bores 6, each of the pistons 42 having a body 44 slidably installed in the cylinder bore 6 and a bridge 46. The bridge 46 of the piston 42 has a recess 48 in which a portion of the outer periphery of the swash plate is positioned. The hemispherical shoe 50 are installed at the shoe pocket 52 formed in the bridge 46 of the piston 42, and slidably engaged with both sides of the outer peripheral portion of the swash plate 28. Consequently, during the rotation of the driving shaft 20, the swash plate 28 rotates also, and the rotational movement of the swash plate 28 is converted into the reciprocation of the piston through the shoe 50. The piston 42 has at its one end a cutout portion 54. The cutout portion 54 functions to prevent the swash plate 28 and the body 44 of the piston 42 from coming into contact with each other when the piston 42 reaches a bottom dead point.

With reference to FIG. 2, the support mechanism 56 for axially supporting the driving shaft 20 is positioned in the center bore 4 of the cylinder block 2, and includes a driving race 60 closely fixed at one side of a thrust bearing 58, which is provided around the driving shaft 20 in the center bore 4 of the cylinder block 2, so as to rotate together with the driving shaft 20, and a stationary race 62 closely fixed at the other side of a thrust bearing 58 so as to be stationary independent on the rotation of the driving shaft 20. The support mechanism 56 further includes a resilient member 64 which supports the driving shaft 20 by axially supporting the thrust bearing 58 and races 60, 62.

In such a compressor, since the driving race 60 should be rotated together with the driving shaft 20, its inner diameter (d1) has to be almost the same as an outer diameter (d2) of the driving shaft 20, and since the stationary race 62 should be kept stationary in the center bore 4, its outer diameter (D3) has to be almost the same as a diameter (d4) of the center bore 4. However, in a prior art compressor, a distance (Lr1) between the inner diameter (d3) of the stationary race 62 and the outer diameter (d2) of the driving shaft 20 is smaller than a distance (Lr2) between the outer diameter (D3) and a surface 4a of the center bore 4. Accordingly, as shown in FIG. 3, the stationary race 66 may be eccentrically assembled with the driving shaft 20 by a predetermined distance, e.g., λ (he maximum eccentric distance) during assembling process. In this case, an inner periphery of the stationary race 66 and an outer periphery of the driving shaft 20 come into contact with each other to generate a frictional heat, thereby deteriorating durability of the compressor. Further, abrasive particle due to the contact (c) between the stationary race 66 and the driving shaft 20 disturbs the flow of the refrigerants, thereby lowering the cooling performance of the air conditioner.

SUMMARY OF THE INVENTION

It is, therefore, a primary object of the present invention to provide a thrust bearing structure capable of the above-mentioned problems, the thrust bearing structure supporting a driving shaft of a variable displacement swash plate type compressor having a stationary and a driving race.

Another object of the present invention is to provide the thrust bearing structure capable of reducing a noise due to friction between the driving shaft and the race.

Still another object of the present invention is to provide the thrust bearing structure capable of improving an assembling process of the races for use in the driving shaft of the variable displacement swash plate type compressor.

In accordance with one aspect of the present invention, there is provided a thrust bearing structure in which a distance between an inner diameter of the stationary race and an outer diameter of the driving shaft is greater than a distance between an outer diameter of the stationary race and a surface of the center bore.

In accordance with another aspect of the present invention, there is provided a thrust bearing structure in which a distance between an outer periphery of the driving race and a surface of the center bore is greater than a distance between an inner periphery of the driving race and an outer periphery of the driving shaft, and a distance between an outer periphery of the stationary race and a surface of the center bore is smaller than a distance between an inner periphery of the stationary race and an outer periphery of the driving shaft.

In accordance with still another aspect of the present invention, there is provided a thrust bearing structure in which an outer diameter of the driving race is smaller than that of the stationary race, and an inner diameter of the driving race is smaller than that of the stationary race.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTIN OF THE PREFERRED EMBODIMENTS

Figure 1:
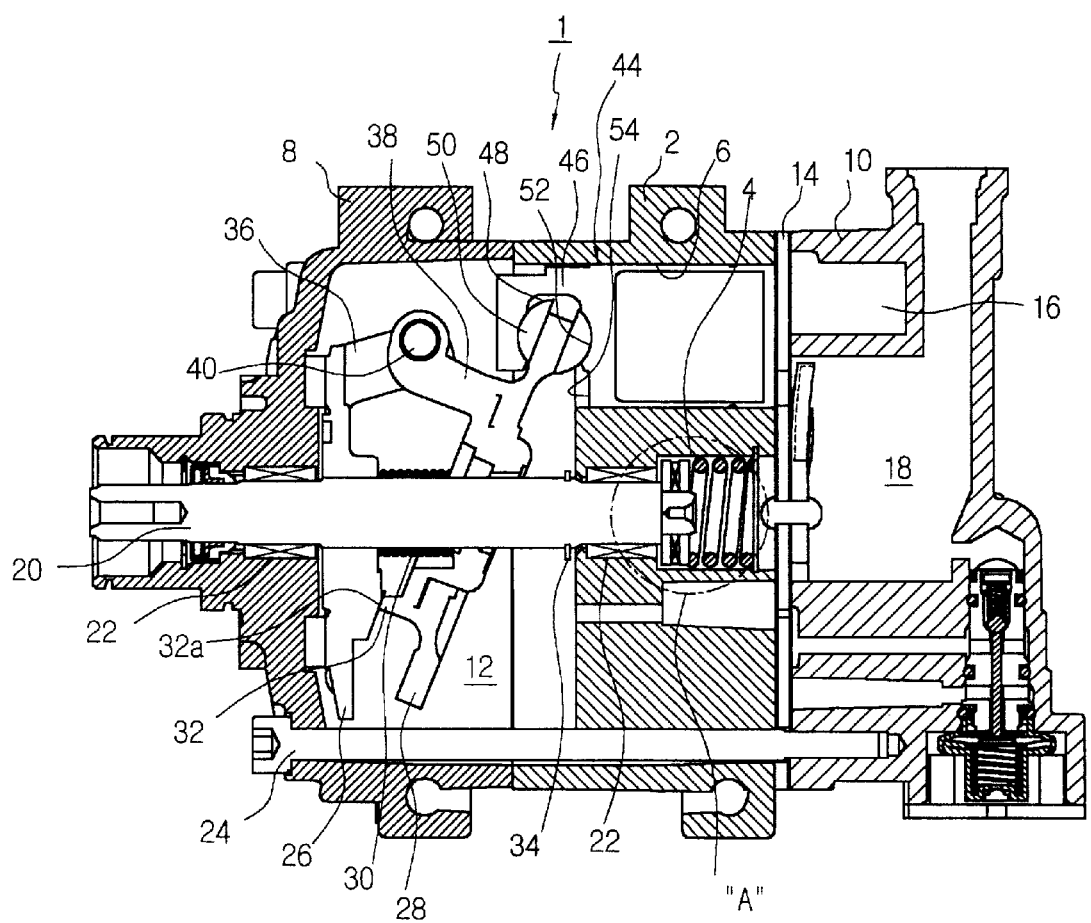
FIG. 1 shows an arrangement of a general variable displacement swash plate type compressor.
Figure 2:
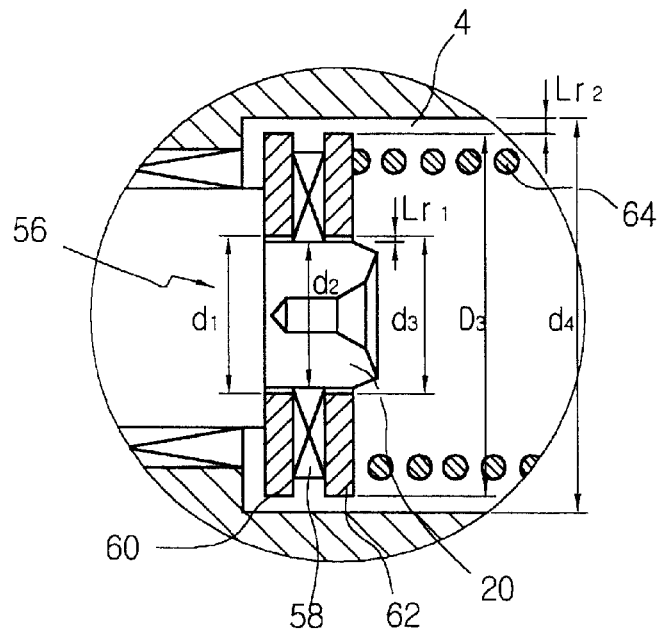
FIG. 2 illustrates a partially expanded view of "A" part of the FIG. 1.
Figure 3:
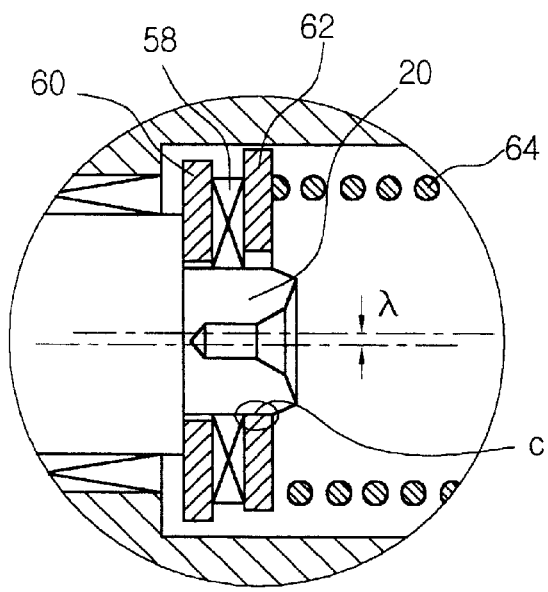
FIG. 3 presents a partially expanded view showing the problems of the prior art variable displacement swash plate type compressor.
Figure 4:
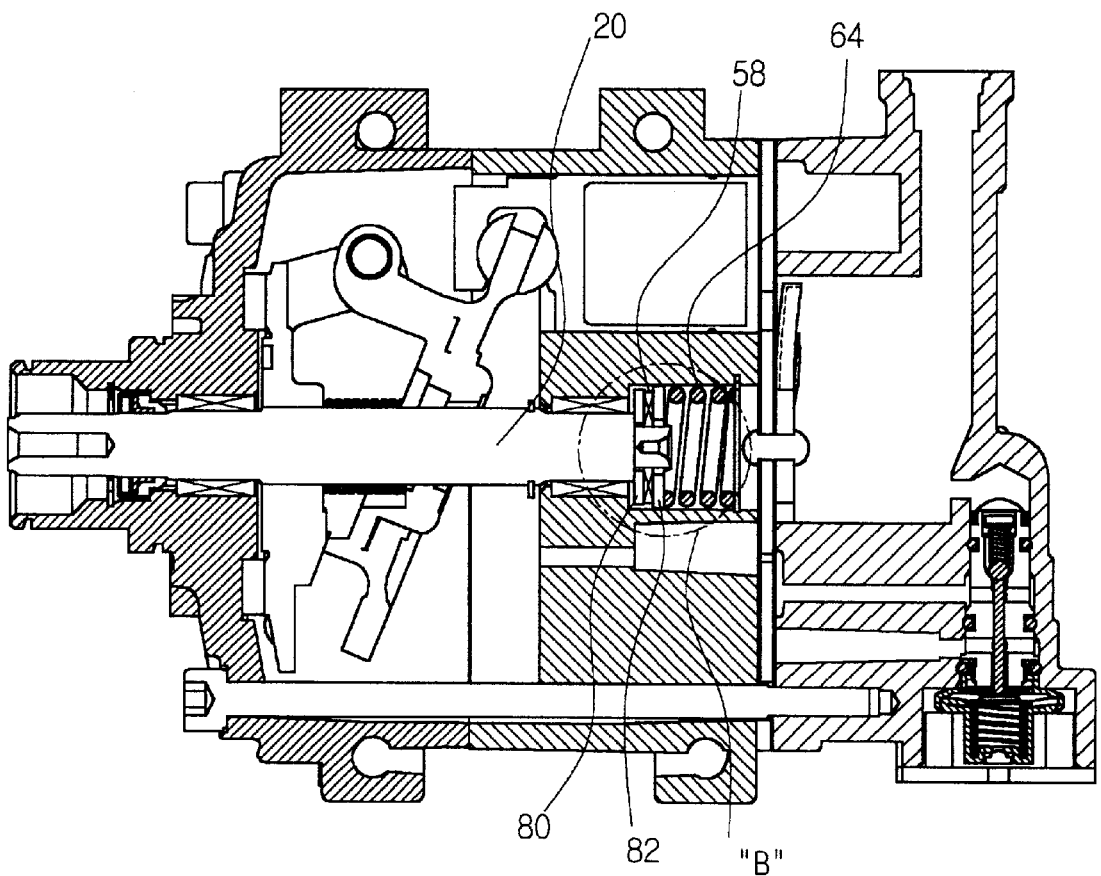
FIG. 4 represents an arrangement of a variable displacement swash plate type compressor in accordance with the present invention.

Referring to FIG. 4, there is a longitudinal sectional view of the inventive variable displacement swash plate type compressor improving a correlation between an inner and an outer diameter of a driving and a stationary races and a center bore and an outer diameter of a driving shaft.

Similarly to the prior art, a driving race 80 and a stationary race 82 are closely fixed at both sides of a thrust bearing 58, respectively. When viewed in FIG. 4, the driving race 80 at the left side rotates together with the driving shaft 20, and the stationary race 82 at the right side is close to one end of a resilient member 64 to support both of the driving shaft 20 and the thrust bearing 62.

In order to rotate the driving race 80 together with the driving shaft 20 and fix the stationary race 82 in the center bore 4, the invention changes the correlations between the inner and the outer diameters of the driving race 80 and the outer diameter of the driving shaft 20 and a diameter (d4) of the center bore 4 in which the driving shaft 20 is inserted.

Figure 5:
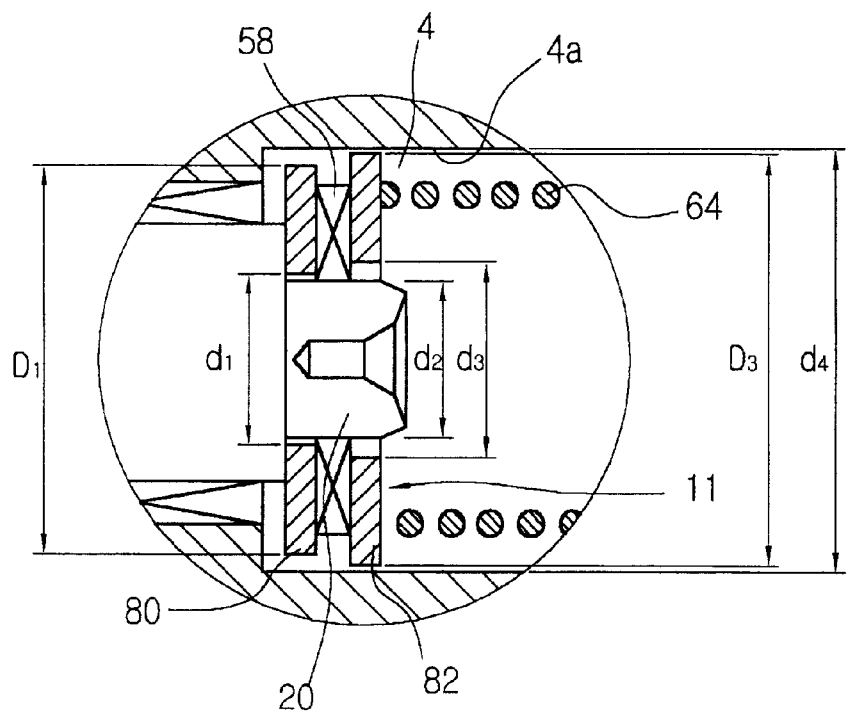
FIG. 5 offers a partially expanded view of "B" part of the FIG. 4.

As shown in FIG. 5, the driving race 80 is designed to have the inner diameter (d1) almost equal to the outer diameter (d2) of the driving shaft 20 so as to be fixedly engaged with the driving shaft 20. Further, the stationary race 82 is designed to have the inner diameter (d3) greater than the outer diameter (d2) of the driving shaft 20 to prevent the stationary race 82 from coming into contact with the outer periphery of driving shaft 20. That is, the inner diameter (d1) of the driving race 80 is smaller than the inner diameter (d3) of the stationary race 82 (d1<d3).

Figure 6:
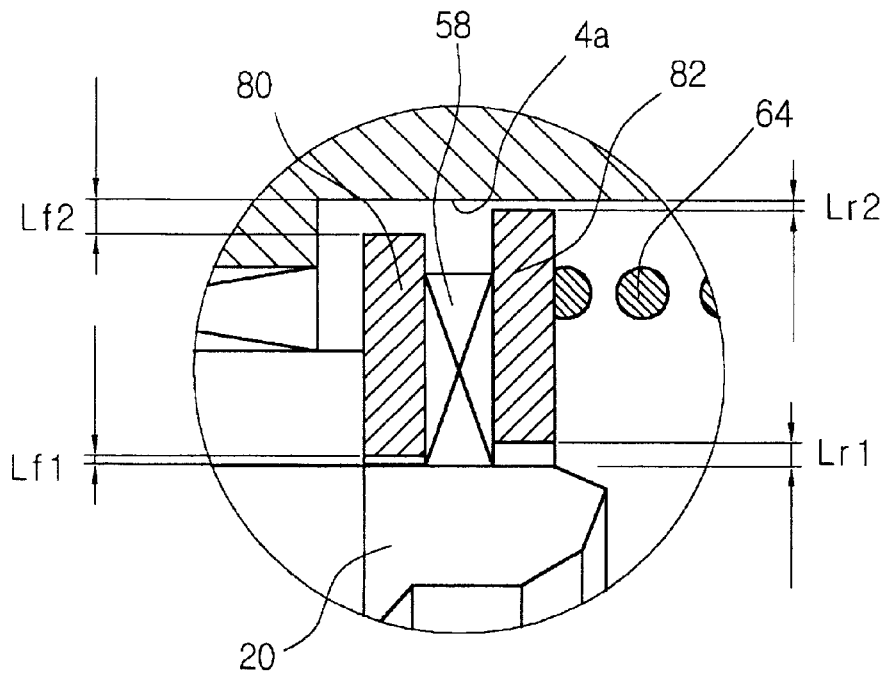
FIG. 6 depicts a partially expanded view illustrating a main portion of the FIG. 4.

Furthermore, as shown in FIG. 6, the correlations between the inner and the outer diameters of both the driving race 80 and the stationary race 82 and the diameter of the center bore 4 and the outer diameter of the driving shaft 20 should satisfy the following relationship:

$$Lr1 > Lr2 \text{ and } Lf2 > Lf1$$

where, Lr1 is a distance between the outer diameter (d2) of the driving shaft 20 and the inner diameter (d3) of the stationary race 82; Lr2 is a distance between the outer diameter (D3) of the stationary race 82 and the surface 4a of the center bore 4; Lf1 is a distance between the outer diameter (d2) of the driving shaft 20 and the inner diameter (d1) of the driving race 80; and Lf2 is a distance between the outer diameter (D1) of the driving race 80 and the surface 4a of the center bore 4.

Therefore, since the stationary race 82 does not come into contact with the driving shaft 20, the driving shaft 20 can rotate smoothly, and since the driving race 80 does not come into contact with the surface 4a of the center bore 4, it can rotate smoothly. Further, since there is no frictional load, the service life of the compressor is extended and the noise of the compressor is reduced.

On the other hand, from the inside of the driving shaft 20 toward the outside, the driving race 80, the thrust bearing 58 and the stationary race 82 are assembled to the driving shaft 20 in order. In this case, since the driving race 80 and the stationary race 82 are similar to each other in shape, there is a likelihood that the driving race 80 and the stationary race 82 be mis-assembled in a reverse order. Accordingly, it is preferable that their sizes are different from each other so as to be visually distinguished.

For this purpose, the driving race 80 and the stationary race 82 may be fabricated in such a way that the outer diameter (D1) of the driving race 80 and the outer diameter (D3) of the stationary race 82 are different to each other. In this case, it is preferable that the outer diameter (D1) of the driving race is smaller than the outer diameter (D3) of the stationary race 82 (D1<D3).

Accordingly, when the races 80 and 82 are assembled to the driving shaft 20, they are visually distinguishable, thereby preventing the mis-assembly thereof. For example, the stationary race 82, which has the outer diameter smaller than that of the driving race 80 is preferentially assembled to the driving shaft 20.

According to the present invention, since the stationary race does not contact with the driving shaft can rotate smoothly. Further, since there is no frictional load, the service life of the compressor is extended and the noise of the compressor is reduced. In addition, since the outer diameters of the races and they are visually distinguishable, it is possible to correctly select the assembling order and to easily and precisely practice the assembly thereof.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

Although the present invention is described based on the preferred embodiment shown in the drawings, the preferred embodiment is just example and the present invention may be applied to a swash plate compressor as well as a compressor having variable capacity or a scroll type compressor.

What is claimed is:

1. A thrust bearing structure for supporting a driving shaft for use in a variable displacement swash plate type compressor, the compressor comprising a cylinder block including a plurality of cylinder bores radially arranged around a center bore;

a front housing and a rear housing for respectively sealing the front and back of the cylinder block;

a driving shaft supported by the front housing and the cylinder block;

a rotor fastened to the driving shaft, the rotor being located in a crank chamber defined by the front housing and the cylinder block;

a variable displacement swash plate hinged to the rotor so as to rotate together with the rotor and the driving shaft, the inclination angle of the swash plate being varied depending on the capacity of the compressor;

a plurality of pistons connected to the swash plate, each of the pistons compressing refrigerants fed to the cylinder bores;

a thrust bearing coupled to one end of the driving shaft;

driving and stationary races provided at both sides of the thrust bearing, respectively; and a resilient member for axially supporting the driving shaft to prevent the driving shaft from moving in an axial direction;

wherein a distance between an inner diameter of the stationary race and an outer diameter of the driving shaft is greater than a distance between an outer diameter of the stationary race and a surface of the center bore.

2. The thrust bearing structure of claim 1, wherein a distance between an inner diameter of the driving race and the outer diameter of the driving shaft is smaller than a distance between an outer diameter of the driving race and the surface of the center bore.

3. The thrust bearing structure of claim 1, wherein an outer diameter of the driving race is smaller than the outer diameter of the stationary race, and an inner diameter of the driving race is smaller than the inner diameter of the stationary race.

* * * * *